United States Patent
Garitty et al.

(10) Patent No.: US 9,781,073 B1
(45) Date of Patent: Oct. 3, 2017

(54) REDIRECTING INVALID URL TO COMPARABLE OBJECT WITH SUFFICIENT PERMISSIONS

(71) Applicant: International Business Machines Corporation, Armonk, NY (US)

(72) Inventors: Kathleen M. Garitty, Austin, TX (US); Michelle A. Mandel, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/297,960

(22) Filed: Oct. 19, 2016

(51) Int. Cl.
G06F 15/16 (2006.01)
H04L 29/12 (2006.01)
H04L 29/06 (2006.01)
H04L 29/08 (2006.01)

(52) U.S. Cl.
CPC .......... H04L 61/1558 (2013.01); H04L 63/10 (2013.01); H04L 63/102 (2013.01); H04L 67/02 (2013.01); H04L 67/1097 (2013.01); H04L 67/2814 (2013.01); H04L 67/42 (2013.01)

(58) Field of Classification Search
CPC .......................... H04L 63/102; H04L 67/2814
USPC ................................................ 709/226, 227
See application file for complete search history.

(56) References Cited

U.S. PATENT DOCUMENTS

| 6,092,100 | A * | 7/2000 | Berstis .............. G06F 17/30887 707/E17.115 |
| 6,735,586 | B2 | 5/2004 | Timmons |
| 7,376,650 | B1 * | 5/2008 | Ruhlen ............. G06F 17/30876 |
| 7,376,752 | B1 * | 5/2008 | Chudnovsky ..... G06F 17/30887 709/217 |
| 7,383,299 | B1 | 6/2008 | Hailpern et al. |
| 2004/0059941 | A1 * | 3/2004 | Hardman ................ H04L 63/08 726/7 |
| 2013/0061291 | A1 * | 3/2013 | Hegg ...................... G06F 21/33 726/4 |
| 2015/0052183 | A1 * | 2/2015 | Inomata ............ G06F 17/30887 707/E17.115 |

OTHER PUBLICATIONS

Ji et al., "Efficient Interactive Fuzzy Keyword Search", Proceedings of the 18th international conference on World Wide Web, ACM, 2009, 10 pages.

(Continued)

Primary Examiner — Hieu Hoang
(74) Attorney, Agent, or Firm — Patterson + Sheridan, LLP (57) ABSTRACT

Systems, methods, and computer program products to perform an operation comprising receiving, by a web server, a client request specifying to access a first object identified by a first uniform resource locator (URL), determining that the first object is not accessible at the first URL, assessing a similarity between each of the plurality of objects with respect to the first object, selecting a second object, of the plurality of objects, based on the assessed similarity to the first object as compared to the assessed similarity of each of the other objects of the plurality of objects relative to the first object, generating a redirect response specifying a second URL corresponding to the second object, and transmitting the redirect response to the client.

15 Claims, 4 Drawing Sheets

(56) References Cited

OTHER PUBLICATIONS

Wang et al., "Automatic URL Completion and Prediction Using Fuzzy Type-Ahead Search", Proceedings of the 32nd nternational ACM SIGIR conference on Research and Development in Information Retrieval, ACM, 2009, 2 pages.

Nikravesh, et al., "Fuzzy logic and the Internet (FLINT): Internet, World Wide Web, and search engines", Soft Computing 6.5 (2002), pp. 287-299.

Li et al., "A workflow services middleware model on ShanghaiGrid", Proceedings of the 2004 IEEE International Conference on Services Computing (SCC'04), 6 pages.

Hahn,T., "Text Retrieval Online: Historical Perspective on Web search Engines", Bulletin of the American Society for Information Science and Technology 24.4 (1998), 5 pages.

\* cited by examiner

REDIRECTING INVALID URL TO COMPARABLE OBJECT WITH SUFFICIENT PERMISSIONS

BACKGROUND

The present invention relates to web servers, and more specifically, to web servers which redirect invalid uniform resource locators (URLs) to a comparable object with sufficient permissions.

Users often make typographical errors when entering a URL in web browsers. For example, the user may type "www.example.com/Index.html", entering a capital "I" where a lowercase "i" should be used (e.g., the filename of the requested object is "index.html"). As such, the target web server would not find a matching object, and return an error to the user's browser. Similarly, even if the user does not make a typographical error, object filenames, locations, access permissions, and/or other properties may change, each leading to an error where the user's browser cannot load the requested object because the request is based on outdated properties.

SUMMARY

In one embodiment, a method comprises receiving, by a web server, a client request specifying to access a first object identified by a first uniform resource locator (URL), determining that the first object is not accessible at the first URL, assessing a similarity between each of the plurality of objects with respect to the first object, selecting a second object, of the plurality of objects, based on the assessed similarity to the first object as compared to the assessed similarity of each of the other objects of the plurality of objects relative to the first object, generating a redirect response specifying a second URL corresponding to the second object, and transmitting the redirect response to the client.

In another embodiment, a system comprises a processor and a memory storing instructions, which when executed by the processor, performs an operation comprising receiving, by a web server, a client request specifying to access a first object identified by a first uniform resource locator (URL), determining that the first object is not accessible at the first URL, assessing a similarity between each of the plurality of objects with respect to the first object, selecting a second object, of the plurality of objects, based on the assessed similarity to the first object as compared to the assessed similarity of each of the other objects of the plurality of objects relative to the first object, generating a redirect response specifying a second URL corresponding to the second object, and transmitting the redirect response to the client.

In another embodiment, a computer-readable storage medium has computer-readable program code embodied therewith, the computer-readable program code executable by a processor to perform an operation comprising receiving, by a web server, a client request specifying to access a first object identified by a first uniform resource locator (URL), determining that the first object is not accessible at the first URL, assessing a similarity between each of the plurality of objects with respect to the first object, selecting a second object, of the plurality of objects, based on the assessed similarity to the first object as compared to the assessed similarity of each of the other objects of the plurality of objects relative to the first object, generating a redirect response specifying a second URL corresponding to the second object, and transmitting the redirect response to the client.

DETAILED DESCRIPTION

Embodiments disclosed herein reduce the number of errors returned by web servers when an exact match to a requested object is not found by the web server. For example, a user or application may request "www.example.com/test.html" from a web server. However, the system administrator may have changed the name of the requested object from "test.html" to "test1.html", meaning that the web server cannot find an exact match to the requested "test.html" object. Advantageously, embodiments disclosed herein perform a search for other objects that have names that are most like the requested object. Furthermore, embodiments disclosed herein determine that any identified objects have sufficient access permissions (e.g., are publicly accessible, or match the permissions of the requested object, etc.) before returning one or more of the identified objects as responsive to the request. Once a matching object that has sufficient permissions is identified, embodiments disclosed herein return the URL of the matching object as part of a hypertext transfer protocol (HTTP) 303 redirect response, which causes the requesting web browser (or application) to automatically request the matching object.

Figure 1:
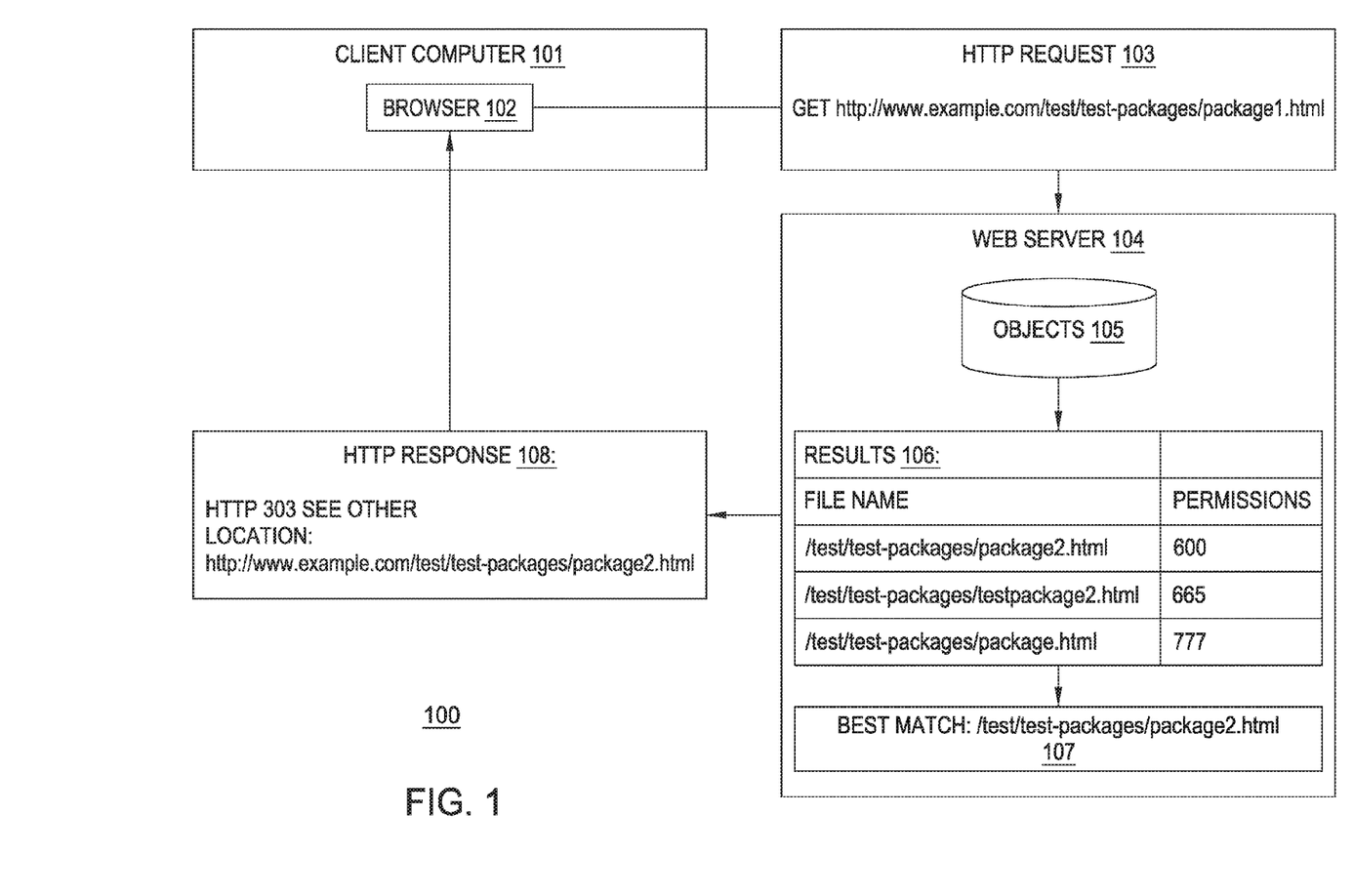
FIG. 1 illustrates an example system for redirecting invalid URLs to comparable objects with sufficient permissions, according to one embodiment.

FIG. 1 illustrates an example system 100 for redirecting invalid URLs to comparable objects with sufficient permissions, according to one embodiment. As shown, the system 100 includes a client computer 101 and a web server 104. The client computer 101 is representative of any type of computing device, such as a laptop, desktop, smartphone, gaming console, tablet, and the like. The client computer 101 includes a web browser 102, which is an application for retrieving, presenting, and traversing information resources on a network, such as the Internet. Although a web browser is used as an example application that accesses resources on a network, the techniques of the disclosure apply equally to any type of application that accesses resources on a network using the HTTP protocol.

The web server 104 is generally configured manage the objects 105. More specifically, the web server 104 stores, processes, and delivers objects 105 to clients, such as the client computer 101. The objects 105 are representative of any type of computer file, such as web pages, digital videos, digital images, electronic documents, and the like.

As shown, the browser 102 generates and transmits an example HTTP request 103 to the web server 104. The HTTP request 103 specifies to get an object, namely "package1.html" which is located at the URL "http://www.example.com/test/test-packages/package1.html". When the web server 104 receives the request 103, the web server 104 references the objects 105 to determine whether a matching object exists. However, in this example, the web server 104 determines that the object is not accessible. For example, the web server 104 determines that "package1.html" does not exist in the objects 105 (and/or is not located in the specified location, namely the directory/test/test-packages).

However, upon determining that a matching object does not exist, the web server 104 may perform a search in the objects 105 to determine whether other objects exist in the objects 105 that are close matches to the requested object. For example, the web server 104 may perform a search in the objects 105 for objects that have a filename that is similar to the requested filename. For example, the search may be a "like" search using the requested filename, where the search results include objects having filenames that are similar to the requested filename. As another example, the search may be a wildcard search that returns all objects having filenames that include the requested filename. In at least one embodiment, the web server 104 restricts the search to objects that are in the specified directory ("test/test-packages" in the above example). However, in other embodiments, the web server 104 searches all directories in the filesystem of the objects 105.

As shown, a result set 106 depicts three example search results returned by searching the objects 105 using the requested filename "package1.html". Each result in the result set 106 includes a filename and a corresponding access permission. For example, the first result in the result set 106 corresponds to an object having a filename and location of "/test/test-packages/package2.html" and a permissions value of 600 (specifying that the owner of the object can read the object and/or write to the object). Similarly, the third result in the result set 106 corresponds to an object having a filename of "/test/test-packages/package.html" and a permissions value of 777 (specifying that all users can read, write, and/or execute the object).

As shown, the web server 104 selects a result 107 from the result set 106 that is the best (or closest) match to the requested object. Generally, the web server 104 selects the result 107 based on a degree to which the object's filename matches the requested filename and/or the object's permissions. In at least one embodiment, the web server 104 computes a score for each result in the result set 106, and returns the result having the highest score as the best result 107. The score may be based on the degree to which the object's filename matches the requested filename and/or the object's permissions. The web server 104 may consider each object's permissions relative to an overall system policy or set of rules specifying what type of permissions are suitable to return. For example, in a highly secure environment, the policy may specify to return objects that have permissions that only allow the owner to read or write, while in a less secure environment, any type of permissions can be returned. In at least one embodiment, the rules and/or policies related to object permissions are stored as metadata in the objects 105.

As shown, the web server 104 generates an HTTP response 108, and sends the HTTP response 108 to the browser 102 of the client 101. The HTTP response 108 is a HTTP 303 response, which is a redirect response. A redirect response causes the recipient web browser (e.g., the browser 102) to request the object specified in the HTTP redirect response 108. In this example, the object specified in the HTTP response 108 is "http://www.example.com/test/test-packages/package2.html". When the web browser 102 receives the HTTP response 108, the web browser 102 automatically generates a new HTTP request that targets "http://www.example.com/test/test-packages/package2.html", which the web browser 102 then sends to the web server 104. Because the requested object exists in the objects 105, the web server 104 sends the requested object (package2.html) to the web browser 102, where a user or application is able to view or otherwise interact with the object (package2.html).

Figure 2:
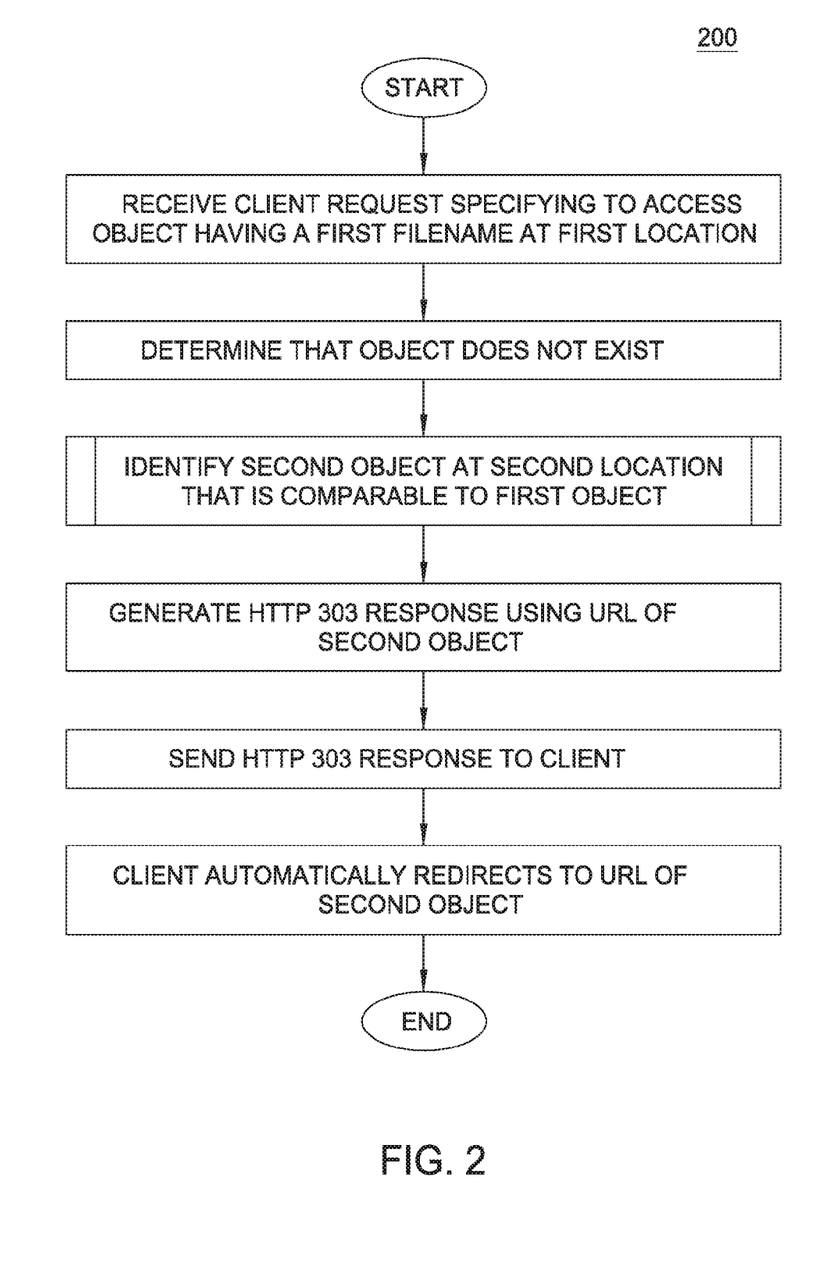
FIG. 2 is a flow chart illustrating an example method to redirect invalid URLs to comparable objects with sufficient permissions, according to one embodiment.

FIG. 2 is a flow chart illustrating an example method 200 to redirect invalid URLs to comparable objects with sufficient permissions, according to one embodiment. As shown, the method 200 begins at block 210, where the web server 104 receives a request from a client (e.g., the web browser 102) specifying to access an object having a first filename and a first location. For example, the requested object may be specified in an HTTP request that specifies "http://www.example.com/cats.html" as a target. At block 220, the web server 104 determines that the requested object does not exist in the objects 105 (and/or the requested object is not present in the location specified in the request). At block 230, described in greater detail with reference to FIG. 3, the web server 104 identifies a second object that is comparable to the first object. The web server 104 generally identifies the second object based on similarities between object filenames and object permissions. For example, the web server 104 may identify a second object named "http://www.example.com/cats_new.html", corresponding to an updated version of the requested object. At block 240, the web server 104 generates an HTTP 303 response specifying a URL of the second object (e.g., http://www.example.com/cats.html). At block 250, the web server 104 sends the HTTP 303 response to the requesting client. At block 260, the client is automatically redirected to the URL of the second object, and loads the second object.

Figure 3:
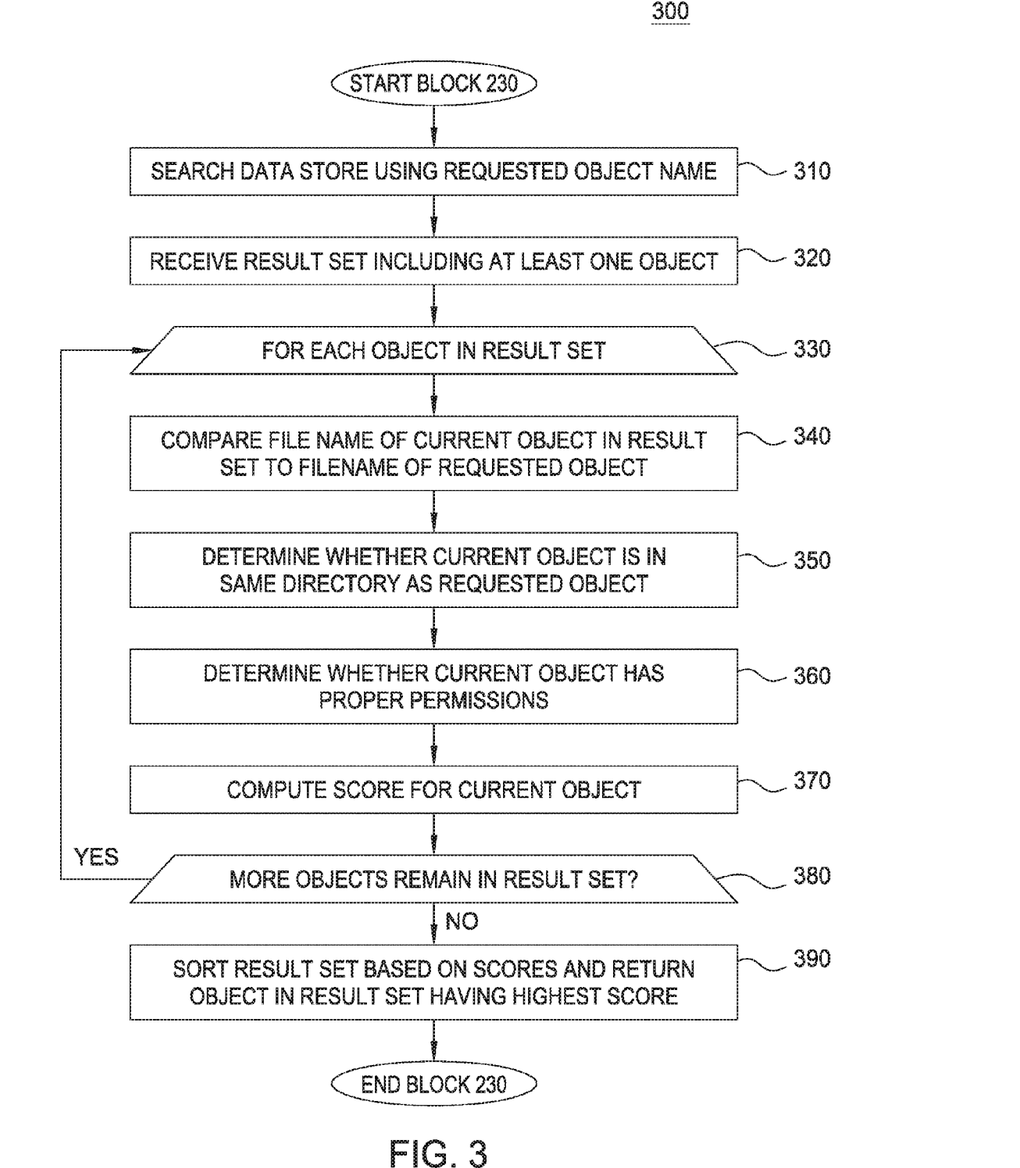
FIG. 3 is a flow chart illustrating an example method to identify a second object at a second location that is comparable to a requested first object, according to one embodiment.

FIG. 3 is a flow chart illustrating an example method 300 corresponding to block 230 to identify a second object at a second location that is comparable to a requested first object, according to one embodiment. As shown, the method 300 begins at block 310, where the web server 104 searches a data store (e.g., the objects 105) using the object name and location specified in the HTTP request received at block 210. The web server 104 may use any feasible search method that returns objects having file names that are similar to the file name of the requested object, such as regular expressions, wildcards, "like" searches, and the like. In one embodiment, the web server 104 applies a similarity threshold to the comparison of file names to restrict matching objects in the object 105 to those objects having a threshold degree of similarity to the file name of the requested object. The similarity threshold may be based on one or more of a minimum number of characters, a maximum number of non-matching characters, the locations of each object, matching concepts present in each file name, and the like. In some embodiments, the web server 104 limits the search to the lowest-level directory specified in the HTTP request. For example, if the HTTP request specifies to provide an object corresponding to the URL "http://www.example.com/test/test-packages/package1.html", the web server 104 may limit the search to the directory "/test/test-packages" or the directory "/test" to find objects that are similar to "package1.html" (or a copy of the requested "package1.html"). At block 320, the web server 104 receives a result set of search results from the objects 105. Generally, the result set includes objects from the objects 105 that are similar to the requested object based on one or more of filename, storage location, file type, access permissions, and the like.

At block 330, the web server 104 executes a loop including blocks 340-370 for each object in the result set. Blocks 340 and 350 are generally directed at comparing certain attributes/properties of the requested object and a respective object in the result set to ascertain a degree of similarity between the two. At block 340, the web server 104 compares the file name of the current object to the file name of the requested object. Generally, at block 340, the web server 104 determines a degree of similarity between the file names of the objects, such as whether the file names reflect that the current object is a newer version of the requested object (e.g., cats1.html or cats2.html), whether the file names are substantially similar but have additional characters (e.g., hyphens, underscores, numerals, etc.), whether the objects are of the same type (e.g., have the same file extensions), and the like. The higher the correspondence between these attributes, the higher the degree of similarity between the file names of the objects. At block 350, the web server 104 determines whether the current object is located in the same directory as the requested object. If the current object is in the same directory as the requested object, the web server 104 may prioritize the current object relative to other objects that are not in the same directory as the requested object. At block 360, the web server 104 determines whether the current object has proper permissions based on one or more rules or policies. For example, a system-wide policy defined in the objects 105 may specify that read-only is the only permitted permission for publicly accessed objects. If the permissions of the current object specify that the current object has a permissions value of 777 (specifying that all users can read, write, and/or execute the object), the web server 104 would determine that the permissions are not appropriate. As such, the web server 104 may refrain from returning the object (and/or may modify the permissions to cause the object's permissions to comply with the requirement).

At block 370, the web server 104 computes a score for the current object, where the score is based on one or more of blocks 340-360 and any other attribute of the current object and/or the requested object. Generally, the score is higher for objects having file names, storage locations, and file types that most closely match those of the requested object, as well as those objects that have permissions which satisfy any applicable rules/policies. At block 380, the web server 104 determines whether more objects remain in the result set. If more objects remain in the result set, the web server 104 returns to block 330. If no more objects remain in the result set, the web server 104 proceeds to block 390.

At block 390, the web server 104 sorts the result set based on the computed score for each result, and returns the object having the highest score as being the best match to the requested object. In at least one embodiment, the web server 104 applies a minimum threshold before returning an object. For example, if the range of possible scores for each object is 0-100, and a threshold is defined at 40, the score for the object returned at block 390 must exceed 40. If no results have a score that exceeds the threshold, the web server 104 may refrain from returning an object to avoid confusing or frustrating the user. In one embodiment, the web server 104 provides a notification to the user that the requested object was not found, but a close match was found. The notification may further inform the user that they will be automatically redirected to the close match. If two or more objects are tied as having the highest score, the web server 104 may select one of the highest scoring objects based on any criterion. For example, the web server 104 may select the object having more restrictive permissions, the object having the most similar filename, the object having a filename that is alphabetically first in list of filenames sorted alphabetically, etc.

Figure 4:
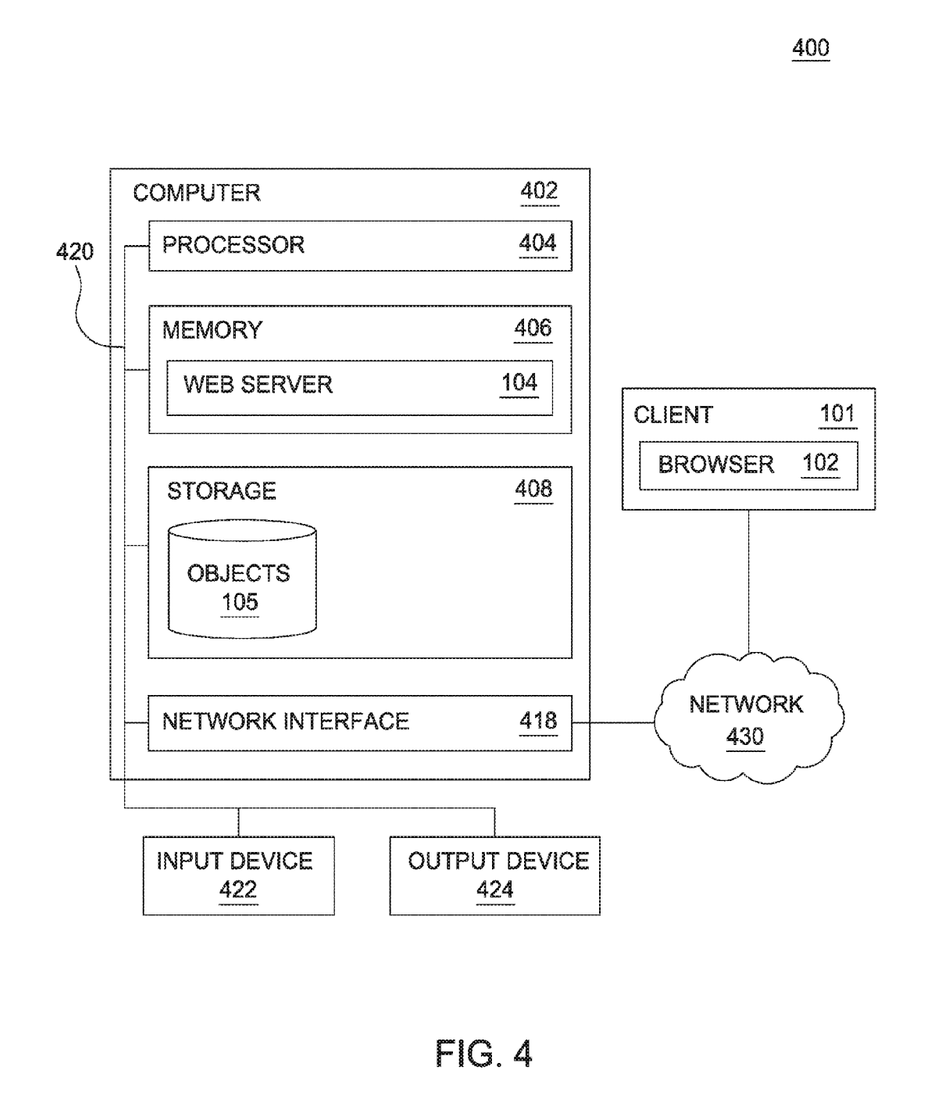
FIG. 4 illustrates an example system which redirects invalid URLs to comparable objects with sufficient permissions, according to one embodiment.

FIG. 4 illustrates an example system 400 which redirects invalid URLs to comparable objects with sufficient permissions, according to one embodiment. The networked system 400 includes a computer 402. The computer 402 may also be connected to other computers (e.g., the client computer 101) via a network 430. In general, the network 430 may be a telecommunications network and/or a wide area network (WAN). In a particular embodiment, the network 430 is the Internet.

The computer 402 generally includes a processor 404 which obtains instructions and data via a bus 420 from a memory 406 and/or a storage 408. The computer 402 may also include one or more network interface devices 418, input devices 422, and output devices 424 connected to the bus 420. The computer 402 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 404 is a programmable logic device that performs instruction, logic, and mathematical processing, and may be representative of one or more CPUs. The network interface device 418 may be any type of network communications device allowing the computer 402 to communicate with other computers via the network 430.

The storage 408 is representative of hard-disk drives, solid state drives, flash memory devices, optical media and the like. Generally, the storage 408 stores application programs and data for use by the computer 402. In addition, the memory 406 and the storage 408 may be considered to include memory physically located elsewhere; for example, on another computer coupled to the computer 402 via the bus 420.

The input device 422 may be any device for providing input to the computer 402. For example, a keyboard and/or a mouse may be used. The input device 422 represents a wide variety of input devices, including keyboards, mice, controllers, and so on. Furthermore, the input device 422 may include a set of buttons, switches or other physical device mechanisms for controlling the computer 402. The output device 424 may include output devices such as monitors, touch screen displays, and so on.

As shown, the memory 406 contains the web server 104, while the storage 408 contains the objects 105, each described in greater detail above. Generally, the system 400 is configured to implement all systems, methods, apparatuses, and other functionality described above.

Advantageously, embodiments disclosed herein modify web servers to reduce the number of errors returned when a user requests an object that is not found at the specified location. By configuring the web server to return matching objects based on a fuzzy search of the requested object file name and permissions of matching objects, embodiments disclosed herein may automatically redirect the user to the closest matching object. Doing so improves the performance of the web server 104 and the overall field of web hosting.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the web server 104 could execute on a computing system in the cloud. In such a case, the web server 104 may store scores for each of a plurality of objects in the objects 105 based on attributes of a requested object at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
    receiving, by a web server, a client request specifying to access a first object identified by a first uniform resource locator (URL);
    determining that the first object is not accessible at the first URL;
    assessing a similarity between each of the plurality of objects with respect to the first object, wherein the similarity is assessed based at least in part on a respective access permission of each of the plurality of objects and an access permission rule;
    determining that the access permission of a second object of the plurality of objects complies with the access permission rule;
    selecting the second object based on the assessed similarity to the first object as compared to the assessed similarity of each of the other objects of the plurality of objects relative to the first object;
    generating a hypertext transfer protocol (HTTP) 303 response specifying a second URL corresponding to the second object; and
    transmitting the HTTP 303 response to the client.

2. The method of claim 1, wherein assessing the similarity comprises:
    searching the plurality of objects based on a file name of the first object specified in the client request; and
    returning a result set comprising at least one object, wherein each object in the result set has a file name that is within a threshold degree of similarity to the file name of the first object.

3. The method of claim 2, wherein assessing the similarity further comprises:
    computing a score for each of the plurality of objects in the result set, wherein the scores are computed based on each of: (i) a degree of similarity between the file name of each object in the result set and the file name of the requested object, (ii) a storage location of each object in the result set and a storage location corresponding to the first URL, and (iii) the access permission of each object in the result set;
    wherein the second object is selected based on determining that the score of the second object is greater than the scores of each other object in the result set.

4. The method of claim 3, wherein searching the plurality of objects comprises one or more of: (i) performing a regular expression search using the file name of the first object, (ii) performing a search for objects having file names that are similar to the file name of the first object, and (iii) performing a wildcard search based on the file name of the first object.

5. The method of claim 1, wherein determining that the first object is not accessible at the first URL comprises determining one or more of: (i) a file name of each of the plurality of objects does not match a file name of the first object, (ii) a storage location corresponding to the first URL does not include an object having a file name matching the file name of the first object.

6. A computer program product, comprising:
    a computer-readable storage medium having computer readable program code embodied therewith, the computer readable program code executable by a processor to perform an operation comprising:

receiving, by a web server, a client request specifying to access a first object identified by a first uniform resource locator (URL);

determining that the first object is not accessible at the first URL;

assessing a similarity between each of the plurality of objects with respect to the first object, wherein the similarity is assessed based at least in part on a respective access permission of each of the plurality of objects and an access permission rule;

determining that the access permission of a second object of the plurality of objects complies with the access permission rule;

selecting the second object based on the assessed similarity to the first object as compared to the assessed similarity of each of the other objects of the plurality of objects relative to the first object;

generating a hypertext transfer protocol (HTTP) 303 response specifying a second URL corresponding to the second object; and transmitting the HTTP 303 response to the client.

7. The computer program product of claim 6, wherein assessing the similarity comprises:

searching the plurality of objects based on a file name of the first object specified in the client request; and returning a result set comprising at least one object, wherein each object in the result set has a file name that is within a threshold degree of similarity to the file name of the first object.

8. The computer program product of claim 7, wherein assessing the similarity further comprises:

computing a score for each of the plurality of objects in the result set, wherein the scores are computed based on each of: (i) a degree of similarity between the file name of each object in the result set and the file name of the requested object, (ii) a storage location of each object in the result set and a storage location corresponding to the first URL, and (iii) the access permission of each object in the result set;

wherein the second object is selected based on determining that the score of the second object is greater than the scores of each other object in the result set.

9. The computer program product of claim 8, wherein searching the plurality of objects comprises one or more of: (i) performing a regular expression search using the file name of the first object, (ii) performing a search for objects having file names that are similar to the file name of the first object, and (iii) performing a wildcard search based on the file name of the first object.

10. The computer program product of claim 6, wherein determining that the first object is not accessible at the first URL comprises determining one or more of: (i) a file name of each of the plurality of objects does not match a file name of the first object, (ii) a storage location corresponding to the first URL does not include an object having a file name matching the file name of the first object.

11. A system, comprising:
a processor; and
a memory storing one or more instructions which, when executed by the processor, performs an operation comprising:

receiving, by a web server, a client request specifying to access a first object identified by a first uniform resource locator (URL);

determining that the first object is not accessible at the first URL;

assessing a similarity between each of the plurality of objects with respect to the first object, wherein the similarity is assessed based at least in part on a respective access permission of each of the plurality of objects and an access permission rule;

determining that the access permission of a second object of the plurality of objects complies with the access permission rule;

selecting the second object based on the assessed similarity to the first object as compared to the assessed similarity of each of the other objects of the plurality of objects relative to the first object;

generating a hypertext transfer protocol (HTTP) 303 response specifying a second URL corresponding to the second object; and transmitting the HTTP 303 response to the client.

12. The system of claim 11, wherein assessing the similarity comprises:

searching the plurality of objects based on a file name of the first object specified in the client request; and returning a result set comprising at least one object, wherein each object in the result set has a file name that is within a threshold degree of similarity to the file name of the first object.

13. The system of claim 12, wherein assessing the similarity further comprises:

computing a score for each of the plurality of objects in the result set, wherein the scores are computed based on each of: (i) a degree of similarity between the file name of each object in the result set and the file name of the requested object, (ii) a storage location of each object in the result set and a storage location corresponding to the first URL, and (iii) the access permission of each object in the result set;

wherein the second object is selected based on determining that the score of the second object is greater than the scores of each other object in the result set.

14. The system of claim 13, wherein searching the plurality of objects comprises one or more of: (i) performing a regular expression search using the file name of the first object, (ii) performing a search for objects having file names that are similar to the file name of the first object, and (iii) performing a wildcard search based on the file name of the first object.

15. The system of claim 11, wherein determining that the first object is not accessible at the first URL comprises determining one or more of: (i) a file name of each of the plurality of objects does not match a file name of the first object, (ii) a storage location corresponding to the first URL does not include an object having a file name matching the file name of the first object.

* * * * *